Patented June 17, 1924.

1,497,720

UNITED STATES PATENT OFFICE.

RICHARD HERZ, OF FRANKFORT-ON-THE-MAIN, AND NORBERT STEIGER, OF FECHEN-
HEIM, NEAR FRANKFORT-ON-THE-MAIN, GERMANY, ASSIGNORS TO LEOPOLD CAS-
SELLA & CO. GESELLSCHAFT MIT BESCHRÄNKTER HAFTUNG, A CORPORATION OF
GERMANY.

DYESTUFFS CONTAINING SULPHUR AND PROCESS OF MAKING SAME.

No Drawing.    Application filed September 1, 1921.    Serial No. 497,729.

*To all whom it may concern:*

Be it known that we, RICHARD HERZ, a Prussian subject, residing at Frankfort-on-the-Main, Germany, Eysseneckstrasse 17, and NORBERT STEIGER, a subject of the Czechoslovakian Republic, residing at Fechenheim, near Frankfort-on-the-Main, Germany, Langstrasse 41, have invented certain new and useful Improvements in Dyestuffs Containing Sulphur and Processes of Making Same, of which the following is a full description.

We have found that new and very valuable dyestuffs are obtained by treating β-oxynaphthoquinonearylimino compounds of the following general formula

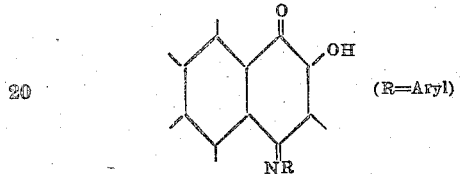

(R=Aryl)

(derived from β-naphthoquinone, its substitution products and sulfonic acids on the one hand and from primary arylamines and their substitution products on the other hand) with suitable sulfurizing agents. Sulphur has been found to be the most suitable sulfurizing agent.

The operation may be carried out by heating the β-oxynaphthoquinonearylimino compounds directly with sulphur or by allowing a solution of sulphur in a suitable solvent for sulphur—as for instance a solution of sulphur in naphthalene or in chlorides of sulphur or finally in fuming sulfuric acid—to act on the above-named compounds.

The addition of a catalyzer acts in some cases favorably.

The new dyestuffs thus obtained probably contain in their molecule the thiazinenucleus, and possess the following general formula:

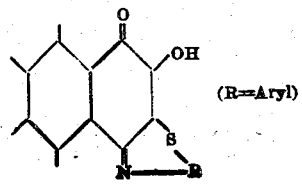

(R=Aryl)

because, as we have found, the same dyestuffs are obtained by condensing suitable sulfurized arylamines, having the sulphur or the sulphur containing group in the orthoposition to the amino group, with β-naphthoquinone or with a derivative or sulfonic acid thereof.

For instance, the dyestuff obtained by treating β-oxynaphthoquinoneanilide with sulphur, or with a solution of sulphur in chlorides of sulphur has been found identical with that produced by condensing o.aminothiophenol with β-naphthoquinone, or 3.4 dichlor β-naphthoquinone. (Annalen der Chemie 283. page 347.)

The new dyestuffs belong to the class of chromium mordant dyestuffs and produce if dyed and printed in the usual manner for this class of dyestuffs bright green, to greenish black, to black shades of excellent fastness.

Those which do not contain acid groups (sulfonic acid or carboxylic acid groups) in their molecule may also be advantageously dyed in the vat and then developed by an after-treatment with suitable metallic salts, preferably chromium salts, into fast green to black shades.

The following examples illustrate our invention:

*Example 1.*—10 kilos of the dry product of condensation of p.toluidine with $\alpha_1\beta_1$ naphthoquinone $\alpha_2$ sulfonic acid having the formula:

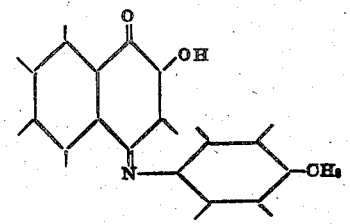

are mixed with 20 kilos of sulphur, 50 kilos of naphthalene and 0.2 kilos of iodide of sulphur or iodine, and this mixture is heated to boiling point for several hours. When the reaction is complete, the naphthalene is first removed (for example, by extracting the melt with hot solvent naphtha) and then the superfluous sulphur, for example by digesting the residue with a concentrated solution of sodium sulphide. The dyestuff thus produced is preferably dissolved in concentrated sulfuric acid, and this solution is then poured on to ice, filtered, washed until it is neutral. It is thus obtained in a very finely divided paste and may then be dyed or printed either in the manner customary for mordant dyestuffs on chrome mordanted wool or cotton, producing thus fast bluish green shades, or it may also be advantageously dyed from the vat.

In an alkaline hydrosulfite solution it is readily soluble to a yellow colored vat and dyes wool from such a vat dark violet shades which turn to claret red on acidifying and to fast bluish green by an aftertreatment with chromium salts in an acid bath.

In a dry state the dyestuff represents a violet powder insoluble in water, sparingly soluble with a red violet color in benzene and chloroform, dissolving with a dark violet color in concentrated sulfuric acid, which solution turns to green by the addition of a little water, whereas by diluting with more water the color is precipitated in red violet flakes. By warming the dyestuff with fuming sulfuric acid until a test becomes soluble in water it is sulfonated and the sulfonic acid thus produced may be separated by pouring the solution on to ice, filtering and washing with a dilute salt solution until it is neutral. If dyed or printed in the manner usual for acid dyeing, chromium mordant dyestuffs of fast bluish green shades are obtained.

Very similar coloring matters are produced if the products of condensation of $\alpha_1\beta_1$ naphthoquinone $\alpha_2$ sulfonic acid with aniline o. m. p. chloraniline—o. m. toluidine, p. anisidine and p. phenitidine are treated as above described.

*Example 2.*—10 kilos of the product of condensation of Example 1, (of $\alpha_1\beta_1$ naphthoquinone $\alpha_2$ sulfonic acid with p. toluidine) are introduced at ordinary temperature whilst stirring into a mixture of 80 kilos of glacial acetic acid and a solution of 8 kilos of sulphur in about 30 kilos of sulphurchloride or disulphurdichloride. The reaction at once commences and is completed without the application of external heat after some hours' stirring. The separated dyestuff is filtered off and purified, if necessary, by digesting it with a concentrated solution of sodium sulphide.

It is also preferable to convert it into a finely divided paste as described in the foregoing example.

It appears to be identical with the dyestuff produced according to Example 1 and it may be used for dyeing and printing purposes in the same manner as this. If the produce of condensation of p. anisidine with the $\alpha_1\beta_1$ naphthoquinone $\alpha_2$ sulfonic acid (having the formula

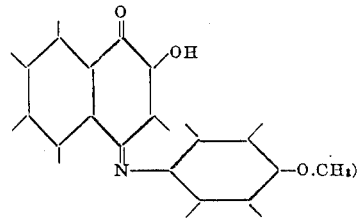

is treated with a solution of sulphur in chloride of sulphur as described above, then a dyestuff is obtained dyeing wool from the vat violet shades which turn to a brilliant yellowish green by an aftertreatment with sodium bichromate in an acid bath; these latter dyeings are distinguished by their excellent fastness to washing, milling, potting and light.

*Example 3.*—8 kilos of sulfur are gradually introduced whilst stirring into 200 kilos of fuming sulfuric acid of about 30% $SO_3$ at a temperature from 20–30° C. As soon as the sulphur is dissolved, 10 kilos of the product of condensation of p. toluidine with $\alpha_1\beta_1$ naphthoquinone—$\alpha_2$ sulfonic acid are added and stirring is continued for some time at 30–40° C. When the reaction is complete, the whole mass is poured on ice, the separated dyestuff is filtered and washed until it is neutral preferably with a dilute salt solution. Besides the formation of the thiazinenucleus in this case a sulfonation of the coloring matter has taken place and an acid dyeing mordant dyestuff is obtained. It produces on chrome mordanted wool or if dyed in an acid bath and aftertreated with chromium salts fast bright green shades. Full green to greenish black acid dyeing mordant dyestuffs are produced if the products of condensation of $\alpha_1\beta_1$ naphthoquinone—$\alpha_2$, sulfonic acid with amidosalicylic acid or amidocresotinic acid are treated with sulphursesquioxide in a manner similar to that above described.

The product of condensation of p. nitraniline with β napththoquinone 4.6 disulfonic acid

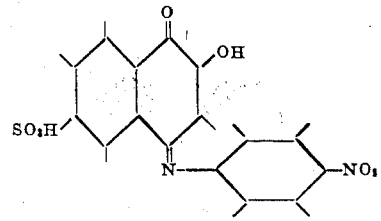

if treated with a solution of sulphur in fuming sulfuric acid as described in this example produces an acid dyeing mordant dyestuff

Having now described our invention, what we claim is:

1. The process of manufacturing new mordant dyestuffs containing in their molecule the thiazine nucleus which consists in heating an oxynaphthoquinonearylimino compound of the following general formula

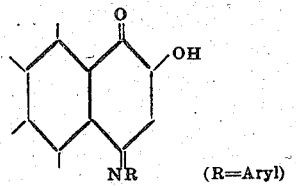

with sulphur substantially as described.

2. The process of manufacturing new mordant dyestuffs containing in their molecule the thiazine nucleus which consists in treating an oxynaphthoquinonearylimino compound of the following general formula

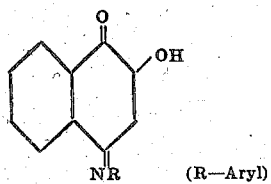

with sulphur in a diluent for sulphur substantially as described.

3. The process of manufacturing new mordant dyestuffs containing in their molecule the thiazine nucleus which consists in treating an oxynaphthoquinonearylimino compound of the following general formula

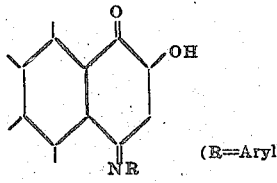

with a solution of sulphur in fuming sulfuric acid.

4. As new products the hereinbefore described new dyestuffs containing in their molecule the thiazine nucleus obtainable by treating an oxynaphthoquinonearylimino compound of the following general formula

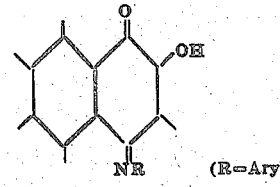

with sulfurizing agents, said dyestuffs being in a dry state violet to dark blue colored powders, sparingly soluble in most of the organic solvents, soluble in concentrated sulfuric acid with a brown to violet to a blue color which by the addition of a little water turns to a bright green color and by diluting with more water to a claret red color, and producing fast green, greenish black to black shades if dyed or printed in the manner usual for chromium mordant dyestuffs, or if dyed in the vat and aftertreated with chromium salts in an acid bath.

5. As a new product the hereinbefore described new mordant dyestuff derived from β oxynaphthoquinone p.toluid by treating it with a solution of sulphur in fuming sulfuric acid, being a sulfonic acid of the thiazine dyestuff of the following probable formula

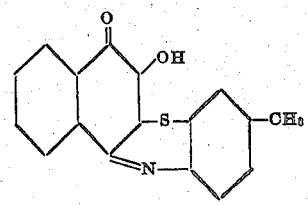

said dyestuff being in a dry state a dark blue powder soluble with a claret red color in water, which color turns to a dark bluish green by the addition of an alkali, sparingly soluble with a claret red color in alcohol and acetone, soluble with an olive brown color in concentrated sulfuric acid, which color turns to a bright green by the addition of a little water and to claret red by adding more water, and producing, when dyed or printed in the manner usual for acid dyeing chromium mordant dyestuffs, bright bluish green shades which are distinguished by their fastness to washing, milling, potting and light.

6. As a new article of manufacture the hereinbefore described new mordant dyestuff derived from β oxynaphthoquinone p.-oxyalkylanilid by treating it with a solution of sulphur in chlorides of sulphur, having probably the following constitutional formula

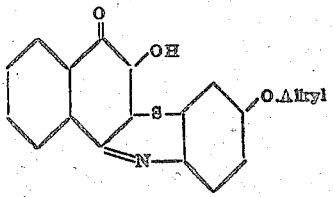

said dyestuff being in a dry state a red violet powder, sparingly soluble in the usual organic solvents, soluble with a claret red color in hot nitrobenzene, soluble with a blue-green color in concentrated sulfuric acid and forming with alkaline hydrosulfite a yellow vat from which wool is dyed in blue shades which turn to fast bright green if aftertreated with chromium salts.

In witness whereof we have hereunto signed our names this 16th day of August, 1921, in the presence of two subscribing witnesses.

RICHARD HERZ, Ph. D.
NORBERT STEIGER, Ph. D.

Witnesses:
JACOB SCHWEIGHOFER,
GUSTAV CLÜNER.